(12) United States Patent
Huang et al.

(10) Patent No.: US 11,807,746 B2
(45) Date of Patent: Nov. 7, 2023

(54) IMPACT-RESISTANT POLYSTYRENE RESIN

(71) Applicant: INDUSTRIAL TECHNOLOGY RESEARCH INSTITUTE, Hsinchu (TW)

(72) Inventors: Kuan-Yeh Huang, Baoshan Township (TW); Jin-An Wu, Huwei Township (TW); Fu-Ming Chien, Hsinchu (TW); Yun-Chen Chang, Taichung (TW); Fan-Jie Lin, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1 day.

(21) Appl. No.: 17/559,599

(22) Filed: Dec. 22, 2021

(65) Prior Publication Data
US 2023/0042674 A1 Feb. 9, 2023

(30) Foreign Application Priority Data
Aug. 5, 2021 (TW) .................. 110128901

(51) Int. Cl.
| | | |
|---|---|---|
| *C08L 25/06* | (2006.01) | |
| *C08L 53/02* | (2006.01) | |
| *C08J 3/12* | (2006.01) | |
| *C08K 5/13* | (2006.01) | |
| *C08K 5/098* | (2006.01) | |

(52) U.S. Cl.
CPC .................. *C08L 25/06* (2013.01); *C08J 3/12* (2013.01); *C08K 5/098* (2013.01); *C08K 5/13* (2013.01); *C08L 53/02* (2013.01); *C08L 2203/30* (2013.01); *C08L 2205/22* (2013.01); *C08L 2207/20* (2013.01)

(58) Field of Classification Search
CPC ....... C08L 25/06; C08L 53/02; C08L 2205/22
See application file for complete search history.

(56) References Cited

U.S. PATENT DOCUMENTS

| | | | | |
|---|---|---|---|---|
| 4,847,150 A | * | 7/1989 | Takeda | .................... C08L 23/02 521/134 |
| 7,638,595 B2 | | 12/2009 | Kruliš et al. | |
| 2002/0099135 A1 | | 7/2002 | Suzuki | |

(Continued)

FOREIGN PATENT DOCUMENTS

| | | |
|---|---|---|
| CN | 1858101 A | 11/2006 |
| CN | 101070413 A | 11/2007 |
| CN | 101186713 A | 5/2008 |

(Continued)

OTHER PUBLICATIONS

Taiwanese Office Action for Appl. No. 110128901 dated Nov. 29, 2022.

*Primary Examiner* — Mark S Kaucher
(74) *Attorney, Agent, or Firm* — Birch, Stewart, Kolasch & Birch, LLP

(57) ABSTRACT

An impact-resistant polystyrene resin includes a continuous phase and a plurality of particles dispersed in the continuous phase. The average particle size of the particles is about 0.1 to 4.0 μm, and the average distance between the particles is about 0.3 to 5.0 μm. The impact-resistant polystyrene resin is made from a polystyrene composition including a polystyrene plastic, a styrene block copolymer, a processing aid, and an antioxidant.

10 Claims, 2 Drawing Sheets

(56) References Cited

U.S. PATENT DOCUMENTS

2015/0252187 A1    9/2015  Liu et al.
2019/0309138 A1 *  10/2019 Cuder .................. C09D 125/06

FOREIGN PATENT DOCUMENTS

| | | | |
|---|---|---|---|
| CN | 102241861 | A | 11/2011 |
| CN | 102199328 | B | 10/2012 |
| CN | 102702633 | A * | 10/2012 |
| CN | 102977622 | A | 3/2013 |
| CN | 102875912 | B | 8/2014 |
| CN | 106589649 | A | 4/2017 |
| CN | 107226966 | A | 10/2017 |
| CN | 108047630 | A | 5/2018 |
| CN | 108641206 | A | 10/2018 |
| TW | 593370 | B | 6/2004 |
| TW | 201431936 | A | 8/2014 |
| TW | 201520268 | A | 6/2015 |
| TW | 201525063 | A | 7/2015 |
| WO | WO-2020082184 A1 * | | 4/2020 ............. B29B 17/02 |

* cited by examiner

IMPACT-RESISTANT POLYSTYRENE RESIN

CROSS REFERENCE TO RELATED APPLICATION

The present application is based on, and claims priority from, Taiwan Application Serial Number 110128901, filed on Aug. 5, 2021, the disclosure of which is hereby incorporated by reference herein in its entirety.

TECHNICAL FIELD

The technical field relates to an impact-resistant polystyrene resin.

BACKGROUND

Polystyrene (PS) has such characteristics as a high glass transition temperature (higher than 100° C.), excellent rigidity, non-flammability, colorability, electric insulation, processing fluidity, and is light in weight and low in price. An expandable polystyrene (EPS, commonly known as Styrofoam) further has the characteristic of heat insulation. Therefore, EPS is widely used in applications such as packaging, electronics, construction, automotive, instrumentation, daily necessities, toys, and heat insulation materials.

EPS products are light in weight and large in size. The recycling cost for EPS products is high due to the high labor and transportation costs. In addition, EPS products have stable chemical properties and are non-perishable. Therefore, most EPS waste in current practice has to be treated by incineration. Waste incineration may cause serious problems with air pollution. In addition, EPS products are widely used in fisheries because they float on water. These EPS products will be arbitrarily abandoned and cause serious marine pollution because they are cheap and have no recycling benefits.

These abandoned EPS products are usually unpolluted, or polluted only on the surface, and have the value of being recyclable. Therefore, research on the recycling and reuse of these PS products can not only solve the problem of waste plastics, but also develop recycling resources, re-entering waste in to the product life cycle.

SUMMARY

A detailed description is given in the following embodiments with reference to the accompanying drawings.

In accordance with some embodiments of the present disclosure, an impact-resistant polystyrene resin is provided. The impact-resistant polystyrene resin includes a continuous phase and a plurality of particles dispersed in the continuous phase. The average particle size of the particles is about 0.1 to 4.0 µm, and the average distance between the particles is about 0.3 to 5.0 µm. The impact-resistant polystyrene resin is made from a polystyrene composition including a polystyrene plastic, a styrene block copolymer, a processing aid, and an antioxidant.

In accordance with some embodiments of the present disclosure, an impact-resistant polystyrene resin is provided. The impact-resistant polystyrene resin is made by the following method: providing a polystyrene composition; and melting and kneading the composition using an extruder to obtain the impact-resistant polystyrene resin. The polystyrene composition comprises a polystyrene plastic, a styrene block copolymer, a processing aid, and an antioxidant. The impact-resistant polystyrene resin comprises a continuous phase and a plurality of particles dispersed in the continuous phase. The average particle size of the particles is 0.1 to 4.0 µm, and the average distance between the particles is 0.3 to 5.0 µm.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
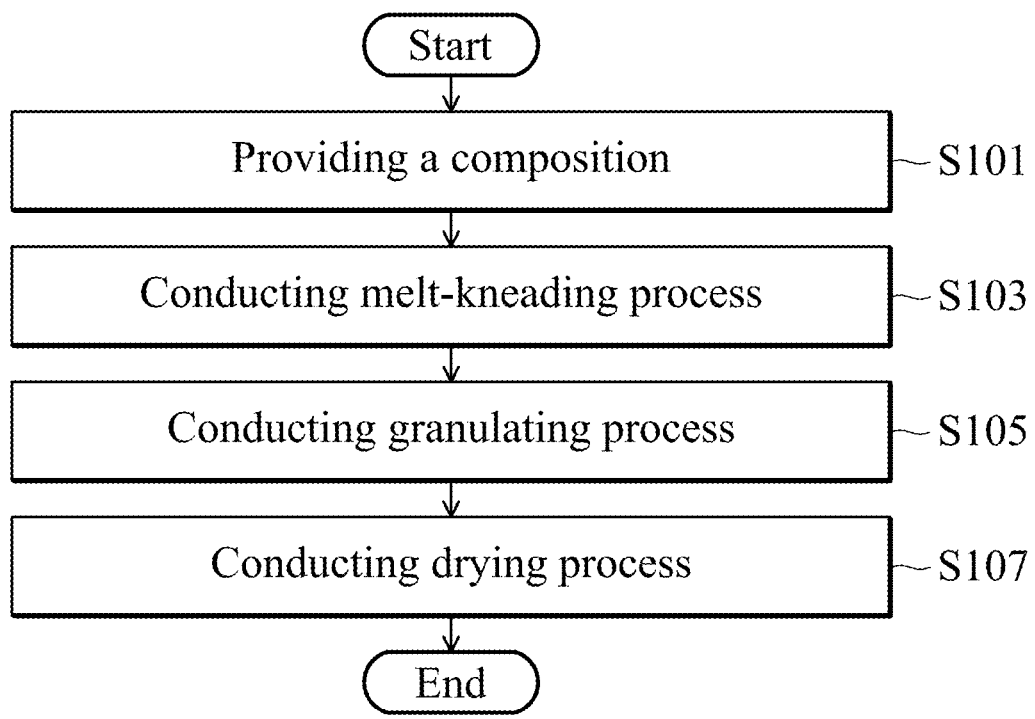
FIG. 1 is a flowchart illustrating a method of manufacturing an impact-resistant polystyrene resin according to an embodiment of the disclosure.

The term "about" "as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, the term "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present disclosure provide an impact-resistant polystyrene resin including a continuous phase and a plurality of particles dispersed in the continuous phase. The average particle size of the particles is 0.1 to 4.0 µm, and the average distance between the particles is 0.3 to 5.0 µm. The impact-resistant polystyrene resin is made of a polystyrene composition. The polystyrene composition includes a polystyrene plastic, a styrene block copolymer, a processing aid, and an antioxidant.

According to an embodiment of the present disclosure, the continuous phase of the impact-resistant polystyrene resin may include the polystyrene plastic, the processing aid, and the antioxidant. According to an embodiment of the present disclosure, the plurality of particles dispersed in the continuous phase may include the styrene block copolymer.

The term "continuous phase" and "particles" in the present disclosure indicate a continuous phase and a plurality of particles dispersed in the continuous phase obtained by image processing and analyzing the micro morphology of the impact-resistant polystyrene resin. The micro morphology of the impact-resistant polystyrene resin is obtained by using an atomic force microscope (AFM). The average particle size of the particles is obtained by taking more than 50 particles after the analysis and averaging lengths of the longest end of the particles. The average distance between the particles is obtained by taking more than 50 particles after the analysis and averaging the shortest distance between two adjacent particles of the particles.

In some embodiments, the particles may have an average particle diameter of 0.1 to 4.0 μm, for example, an average particle diameter of 0.1 to 3.5 μm, 0.2 to 3.5 μm, 0.1 to 3.0 μm, or 0.2 to 3.0 μm. Two adjacent particles are dispersed in the continuous phase at an average distance of 0.3 to 5.0 μm. The average distance may be, for example, 0.3 to 4.0 μm, 0.4 to 4.0 μm, 0.5 to 4.0 μm, 0.3 to 5.0 μm, or 0.4 to 4.0 μm.

According to an embodiment of the present disclosure, the above-mentioned impact-resistant polystyrene resin is made of a polystyrene composition. In the polystyrene composition, the content of polystyrene plastic may be greater than or equal to 70 wt %, such as 80 wt %, 85 wt %, 90 wt %, or 95 wt %.

In the present disclosure, the polystyrene plastic may be entirely new polystyrene plastic, recycled polystyrene plastic or a mixture thereof. In some embodiments, the recycled polystyrene plastic has an impurity content of less than 500 ppm. In some embodiments, the recycled polystyrene plastic may be polystyrene marine wastes. In some embodiments, the recycled polystyrene plastic may be polystyrene marine wastes that does not contain halogen or heavy metals.

In some embodiments, the styrene block copolymer in the polystyrene composition may include styrene-ethylene-butylene-styrene (SEBS) rubber, styrene-ethylene-propylene-styrene (SEPS) rubber, styrene-butadiene (SB) rubber, styrene-isoprene-styrene (SIS) rubber, or a combination thereof, but the present disclosure is not limited thereto. In some embodiments, the styrene block copolymer may further include styrene-butadiene-styrene (SBS) rubber.

Styrene-ethylene-butylene-styrene (SEBS) rubber has characteristics of high strength, ozone and ultraviolet resistance, thermal stability, good heat resistance, and good toughness. Styrene-ethylene-propylene-styrene (SEPS) rubber has characteristics of good heat resistance and good oxidation resistance. Styrene-butadiene (SB) rubber has characteristics of good aging resistance, good heat resistance, and good abrasion resistance. Styrene-isoprene-styrene (SIS) rubber has characteristics of good softness and high elasticity. Styrene-butadiene-styrene (SBS) rubber has characteristics of high strength, high transparency, and good tensile strength. Person having ordinary skill in the art may select the type of the styrene block copolymer and adjust the proportion and content of the styrene block copolymer to be used according to their needs.

For example, if an impact-resistant polystyrene resin with greater tensile strength is desired, the styrene block copolymer may only include SEPS rubber, or the content of SEPS rubber in the styrene block copolymer may be increased. If an impact-resistant polystyrene resin with greater bending strength is desired, the styrene block copolymer may only include SIS rubber, or the content of SIS rubber in the styrene block copolymer may be increased. However, the present disclosure is not limited thereto, person having ordinary skill in the art may adjust the ratio of each component in the styrene block copolymer to obtain the desired characteristics.

In some embodiments, the polystyrene composition may include 5-30 parts by weight of styrene block copolymer based on 100 parts by weight of the polystyrene plastic. In some embodiments, the content of the styrene block copolymer in the polystyrene composition may be in a range of 10-30 parts by weight. In some embodiments, the content of the styrene block copolymer in the polystyrene composition may be in a range of 15-30 parts by weight.

In the present disclosure, the processing aid refers to the plastic aids excluding antioxidants, which may include a lubricant, an antistatic agent, a stabilizer, a plasticizer, or a combination thereof. Examples of lubricants may include but not limited to, ethylene bisstearylamide, erucamide, dioctyl phthalate, and organic silicone oil. Examples of the plasticizer may include but not limited to, epoxy soybean oil and naphthenic rubber oil. Examples of stabilizers may include but not limited to, stearates.

In some embodiments, the polystyrene composition may include 0.1 to 1.0 parts by weight of the processing aid based on 100 parts by weight of the polystyrene plastic. In some embodiments, the content of the processing aid in the polystyrene composition may be in a range of 0.1 to 0.5 parts by weight.

In the present disclosure, the antioxidant may include a hindered phenolic antioxidant, a thioester antioxidant, a phosphite antioxidant, or a combination thereof.

In some embodiments, the polystyrene composition may include 0.1 to 1.0 parts by weight of antioxidant based on 100 parts by weight of the polystyrene plastic. In some embodiments, the content of the antioxidant in the polystyrene composition may be in a range of 0.1 to 0.3 parts by weight.

According to the embodiments of the present disclosure, the impact-resistant polystyrene resin of the present disclosure can provide a polystyrene composition with improved tensile strength, flexural strength, Rockwell hardness, impact resistance strength, or a combination thereof even use high content recycled polystyrene plastics.

Another embodiment of the present disclosure provides a method for manufacturing an impact-resistant polystyrene resin and an impact-resistant polystyrene resin manufactured by the manufacturing method. FIG. 1 is a flowchart illustrating a method 10 of manufacturing an impact-resistant polystyrene resin according to an embodiment of the disclosure. As shown in FIG. 1, the method 10 for manufacturing an impact-resistant polystyrene resin according to an embodiment of the present disclosure includes: a step S101 for providing a composition, a step S103 for conducting melt-kneading process to melt and knead the composition, a step S105 for conducting granulating process to granulate the impact-resistant polystyrene resin, and a step S107 for conducting drying process to dry the granulated impact-resistant polystyrene resin.

The composition provided in the step S101 includes a polystyrene plastic, a styrene block copolymer, a processing aid, and an antioxidant. In the composition, the content of polystyrene plastic may be greater than or equal to 70 wt %, for example, 80 wt %, 85 wt %, 90 wt %, or 95 wt %.

The polystyrene plastic in the composition may be entirely new polystyrene plastic, recycled polystyrene plastic, or a mixture of thereof. In some embodiments, the recycled polystyrene plastic has an impurity content of less than 500 ppm. In some embodiments, the recycled polystyrene plastic may be polystyrene marine wastes. In some embodiments, the recycled polystyrene plastic may be polystyrene marine wastes that does not contain halogen or heavy metals.

The styrene block copolymer in the composition may include styrene-ethylene-butylene-styrene (SEBS) rubber, styrene-ethylene-propylene-styrene (SEPS) rubber, styrene-butadiene (SB) rubber, styrene-isoprene-styrene (SIS) rubber, or a combination thereof as described above, but the present disclosure is not limited thereto. In some embodiments, the styrene block copolymer may further include styrene-butadiene-styrene (SBS) rubber.

In some embodiments, the composition may include 5-30 parts by weight of styrene block copolymer based on 100 parts by weight of the polystyrene plastic. In some embodiments, the content of the styrene block copolymer in the composition may be in a range of 10-30 parts by weight. In some embodiments, the content of the styrene block copolymer in the composition may be in a range of 15-30 parts by weight.

In the present disclosure, the processing aid refers to the plastic aids excluding antioxidants, which may include a lubricant, an antistatic agent, a stabilizer, a plasticizer, or a combination thereof. Examples of lubricants may include but not limited to, ethylene bisstearylamide, erucamide, dioctyl phthalate, and organic silicone oil. Examples of the plasticizer may include but not limited to, epoxy soybean oil and naphthenic rubber oil. Examples of stabilizers may include but not limited to, stearates.

In some embodiments, the composition may include 0.1 to 1.0 parts by weight of processing aids based on 100 parts by weight of the polystyrene plastic. In some embodiments, the content of the processing aid in the composition may be in a range of 0.1 to 0.5 parts by weight.

In the present disclosure, the antioxidant may include a hindered phenolic antioxidant, a thioester antioxidant, a phosphite antioxidant, or a combination thereof.

In some embodiments, the composition may include 0.1 to 1.0 parts by weight of antioxidant based on 100 parts by weight of the polystyrene plastic. In some embodiments, the content of the antioxidant in the composition may be in a range of 0.1 to 0.3 parts by weight.

Next, feeding the composition provided in the step S101 into an extruder, and performing the step S103 for melting and kneading the composition. The melt-kneading process in step S103 is performed by an extruder that includes a screw. In some embodiments, the extruder may include a single screw extruder, a twin screw extruder, or a planetary mixing extruder, but the disclosure is not limited thereto. The extruder may be any extrusion device that includes a screw.

The screw may include a tooth-shaped element, a disk-shaped element, a spiral element, or a combination thereof. In one embodiment, the screw includes at least one tooth-shaped element. In this disclosure, the terms "tooth-shaped element", "disk-shaped element", and "spiral element" indicate screw blocks or screw sleeves that make the screw with a desired pattern.

The melt-kneading process in the step S103 may be performed at a process temperature of about 150 to 300° C. and a rotation speed of about 50 to 300 rpm.

If the process temperature in the melt-kneading process is too high, the aging of the material may be accelerated. If the process temperature in the melt-kneading process is too low, the composition may melt completely. Therefore, in actual operation, the process temperature in the melt-kneading process can be appropriately adjusted according to the components in the material. In some embodiments, the melt-kneading process in the step S103 may be performed at a process temperature of about 170-260° C.

The term "rotation speed" in the melt-kneading process indicates the rotation speed of the screw in the extruder. During the melt-kneading process, the higher the rotation speed, the larger the mechanical force the screw exerts on the material, and the more uniform the kneaded material will be. However, if the rotation speed exceeds the allowable range of the material, the material will be cracked. Therefore, the rotation speed in the melt-kneading process can be appropriately adjusted according to the components in the material. In some embodiments, the melt-kneading process in the step S103 may be performed at a rotation speed of about 150-300 rpm.

The impact-resistant polystyrene resin of the present disclosure can be obtained in the step S103 after the melting and the kneading are completed. Next, a granulating process in the step S105 and a drying process in the step S107 are performed to obtain an impact-resistant polystyrene resin that can be stably stored. The drying process of the step S107 may be performed at a temperature of 80-100° C.

Impact-resistant polystyrene resins with different impact resistances may be manufactured by the disclosed method for manufacturing an impact-resistant polystyrene resin by adjusting the combination of the screw blocks or screw sleeves of the screw in the extruder and the process temperature and the rotation speed used in the melt-kneading process. The impact-resistant polystyrene resin manufactured by the manufacturing method of the present disclosure includes a continuous phase and a plurality of particles dispersed in the continuous phase. The particles have an average particle diameter of 0.1 to 4.0 μm, and an average distance between two adjacent particles of the particles is about 0.3 to 5.0 μm.

The impact-resistant polystyrene resin manufactured by the manufacturing method of the present disclosure can provide a polystyrene composition with improved tensile strength, flexural strength and hardness even a high content recycled polystyrene plastics is used.

Specific examples of the present disclosure are provided below for further illustrating the advantages of the present disclosure over the prior art, but the advantages of the present disclosure are not limited thereto.

Example 1

Figure 2:
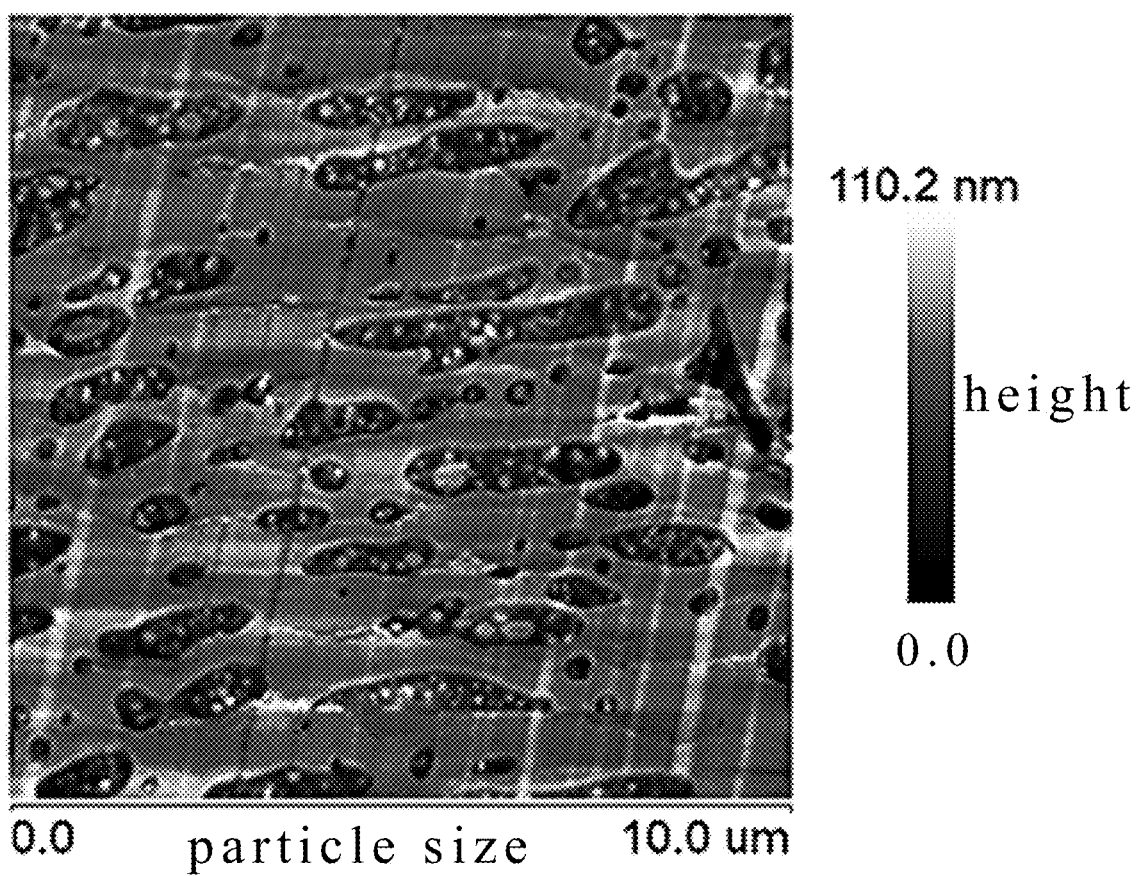
FIG. 2 is an atomic force microscope (AFM) photo of an impact-resistant polystyrene resin according to an embodiment of the disclosure.

Mixing 100 parts by weight of recycled polystyrene plastic, 30 parts by weight of SEBS 6014, 0.1 parts by weight AO1010 (hindered phenolic antioxidant) and 0.3 parts by weight of zinc stearate based on 100 parts by weight of recycled polystyrene plastic to provide a composition, wherein the recycled polystyrene plastic includes neither halogens nor heavy metals and an impurity content of less than 500 ppm. Feeding the composition into a twin screw extruder (model ZSK26, L/D=48) at a temperature of 170-260° C. and a rotation speed of 200 rpm for melting and kneading the composition to obtain an impact-resistant polystyrene resin. Drying the granulated impact-resistant polystyrene resin at a temperature of 80-100° C. after granulating the impact-resistant polystyrene resin through a granulator (model GZML-110L-150) to obtain an impact-resistant polystyrene resin HSI. The screw in the twin-screw extruder contains the following element combinations: SK element/KB45 element/KB45 element/SME element/ZME element/ZME element/SK element. Processing HSI with an atomic force microscope (AFM) and measuring and calculating the average particle size of the particles and the average distance between the particles in HIS based on the image processing of HSI. FIG. 2 is an atomic force microscope (AFM) photo of HSI. It can be seen from FIG. 2 that a plurality of micron-sized particles are dispersed in a continuous phase. The average particle size of these particles (taking more than 50 particles and averaging lengths of the longest end of the particles) and the average distance between two adjacent particles (taking more than 50 particles and averaging the shortest distance between the particles) may be calculated based on FIG. 2.

Examples 2 to 12 and Comparative Examples 1 to 3

Except for the type of and the content (parts by weight) of the styrene block copolymers, impact-resistant polystyrene resins HSII-HSXII of Examples 2 to 12 and polystyrene resins PSI-PSIII of Comparative Examples 1 to 3 are manufactured by the same process as in Example 1. The type of and the content of the styrene block copolymers used in Examples 2 to 12 and Comparative Examples 1 to 3 are listed in the following Tables 1 to 3.

TABLE 1

|  | HSI (Example 1) | HSII (Example 2) | HSIII (Example 3) | HSIV (Example 4) | HSV (Example 5) | HSVI (Example 6) |
|---|---|---|---|---|---|---|
| Recycled polystyrene plastic (parts by weight) | 100 | 100 | 100 | 100 | 100 | 100 |
| SEBS (parts by weight) | 30 | 28 | 0 | 0 | 0 | 15 |
| SEPS (parts by weight) | 0 | 0 | 28 | 0 | 0 | 13 |
| SB (parts by weight) | 0 | 0 | 0 | 28 | 0 | 0 |
| SIS (parts by weight) | 0 | 0 | 0 | 0 | 28 | 0 |
| Processing aid (parts by weight) | 0.3 | 0.3 | 0.3 | 0.3 | 0.3 | 0.3 |
| Antioxidant (parts by weight) | 0.1 | 0.1 | 0.1 | 0.1 | 0.1 | 0.1 |

TABLE 2

|  | HSVII (Example 7) | HSVIII (Example 8) | HSIX (Example 9) | HSX (Example 10) | HSXI (Example 11) | HSXII (Example 12) |
|---|---|---|---|---|---|---|
| Recycled polystyrene plastic (parts by weight) | 100 | 100 | 100 | 100 | 100 | 100 1 |
| SEBS (parts by weight) | 20 | 8 | 20 | 7 | 15 | 20 |
| SEPS (parts by weight) | 0 | 10 | 0 | 7 | 0 | 0 |
| SB (parts by weight) | 8 | 0 | 0 | 7 | 0 | 0 |
| SIS (parts by weight) | 0 | 10 | 8 | 7 | 0 | 0 |
| Processing aid (parts by weight) | 0.3 | 0.3 | 0.3 | 0.3 | 0.3 | 0.3 |
| Antioxidant (parts by weight) | 0.1 | 0.1 | 0.1 | 0.1 | 0.1 | 0.1 |

TABLE 3

|  | PSI (Comparative Example 1) | PSII (Comparative Example 2) | PSIII (Comparative Example 3) |
|---|---|---|---|
| Recycled polystyrene plastic (parts by weight) | 100 | 100 | 100 |
| SEBS (parts by weight) | 0 | 50 | 100 |
| SEPS (parts by weight) | 0 | 0 | 0 |
| SB (parts by weight) | 0 | 0 | 0 |
| SIS (parts by weight) | 0 | 0 | 0 |
| Processing aid (parts by weight) | 0.3 | 0.3 | 0.3 |
| Antioxidant (parts by weight) | 0.1 | 0.1 | 0.1 |

Measuring Melt Flow Indexes, tensile strengths, flexural strengths, heat distortion temperatures (HDT), Rockwell hardness, and impact resistance strengths of the impact-resistant polystyrene resins HSI-HSXII of Examples 1 to 12 and the polystyrene resins PSI-PSIII of Comparative Examples 1 to 3 by ASTM D1238, ASTM D638, ASTM D790, ASTM D648, CNS 2114, and ASTM D256 (Notched Charpy Impact Strength) respectively. Processing the impact-resistant polystyrene resins HSI-HSXII of Examples 1 to 12 and the polystyrene resins PSI-PSIII of Comparative Examples 1 to 3 by an atomic force microscope (AFM) and measuring and calculating the average particle size of the particles and the average distance between the particles in the impact-resistant polystyrene resins HSI-HSXII of Examples 1 to 12 and the polystyrene resins PSI-PSIII of Comparative Examples 1 to 3 based on the image processing thereof. The results are shown in Table 4 to Table 6 below.

TABLE 4

|  | HSI (Example 1) | HSII (Example 2) | HSIII (Example 3) | HSIV (Example 4) | HSV (Example 5) | HSVI (Example 6) |
| --- | --- | --- | --- | --- | --- | --- |
| Melt Flow Index (200° C. @ 5 kg) | 7.0 | 9.7 | 8.8 | 8.1 | 7.8 | 6.8 |
| Tensile strength (kg/cm$^2$) | 347 | 372 | 388 | 375 | 348 | 379 |
| Flexural strength (kg/cm$^2$) | 472 | 500 | 512 | 503 | 525 | 498 |
| H.D.T (° C.) | 94.4 | 96.5 | 96.7 | 96.0 | 95.9 | 96.8 |
| Rockwell hardness (R-scale) | 80.7 | 83.1 | 85.4 | 84.6 | 88.0 | 84.4 |
| Impact resistance strength (23° C.) (kJ/m$^2$) | 14.6 | 12.7 | 10.6 | 11.2 | 10.2 | 11.7 |
| Content of the recycled polystyrene plastic* (%) | 76.7 | 77.9 | 77.9 | 77.9 | 77.9 | 77.9 |
| Average particle diameter (μm) | 0.4~3.0 | 0.3~2.5 | 0.5~2.7 | 0.2~2.5 | 0.5~3.0 | 0.4~2.8 |
| Average distance (μm) | 0.5~3.2 | 1.0~3.8 | 0.8~3.6 | 0.6~2.9 | 0.5~3.2 | 0.6~3.2 |

*The content of the recycled polystyrene plastic (%) indicates the content of the recycled polystyrene plastic in the polystyrene composition used as raw materials.

TABLE 5

|  | HSVII (Example 7) | HSVIII (Example 8) | HSIX (Example 9) | HSX (Example 10) | HSXI (Example 11) | HSXII (Example 12) |
| --- | --- | --- | --- | --- | --- | --- |
| Melt Flow Index (200° C. @ 5 kg) | 7.4 | 6.5 | 9.5 | 7.6 | 6.3 | 6.4 |
| Tensile strength (kg/cm$^2$) | 368 | 389 | 380 | 372 | 414 | 385 |
| Flexural strength (kg/cm$^2$) | 502 | 483 | 504 | 499 | 528 | 498 |
| H.D.T (° C.) | 95.9 | 97.2 | 96.6 | 96.8 | 99.4 | 96.7 |
| Rockwell hardness (R-scale) | 85.0 | 87.5 | 84.5 | 86.2 | 97.5 | 86.8 |
| Impact resistance strength (23° C.) (kJ/m$^2$) | 10.8 | 8.9 | 10.5 | 8.7 | 5.5 | 7.6 |
| Content of the recycled polystyrene plastic* (%) | 77.9 | 77.9 | 77.9 | 77.9 | 86.7 | 83.0 |
| Average particle diameter (μm) | 0.5~2.6 | 0.6~3.0 | 0.3~2.7 | 0.4~2.8 | 0.3~2.1 | 0.4~2.7 |
| Average distance (μm) | 0.8~3.8 | 0.9~3.6 | 0.5~3.4 | 0.6~3.8 | 1.0~3.9 | 0.6~3.7 |

TABLE 6

|  | PSI (Comparative Example 1) | PSII (Comparative Example 2) | PSIII (Comparative Example 3) |
| --- | --- | --- | --- |
| Melt Flow Index (200° C. @ 5 kg) | 5.2 | 5.6 | 4.2 |
| Tensile strength (kg/cm$^2$) | 445 | 313 | 198 |
| Flexural strength (kg/cm$^2$) | 545 | 401 | 188 |
| H.D.T (° C.) | 98.6 | 95.4 | 90.8 |
| Rockwell hardness (R-scale) | 119.4 | 70.6 | 31.3 |
| Impact resistance strength (23° C.) (kJ/m$^2$) | 1.6 | 18.8 | 52.29 |
| Content of the recycled polystyrene plastic* (%) | 99.6 | 66.5 | 49.9 |
| Average particle diameter (μm) |  | 0.1~5.2 | 0.2~7.8 |
| Average distance (μm) |  | 1.0~5.3 | 0.8~6.1 |

According to Table 4 and Table 5, the Melt Flow Indexes of the impact-resistant polystyrene resins made of the polystyrene composition of the present disclosure are all greater than 6 (200° C. @5 kg). The tensile strength of the impact-resistant polystyrene resins made of the polystyrene composition of the present disclosure is greater than 300 (kg/cm$^2$). The flexural strengths of the impact-resistant polystyrene resins made of the polystyrene composition of the present disclosure are close to or greater than 500

(kg/cm$^2$). The heat distortion temperature of the impact-resistant polystyrene resins made of the polystyrene composition of the present disclosure is higher than 94° C. The Rockwell hardness of the impact-resistant polystyrene resins made of the polystyrene composition of the present disclosure is greater than 80 (R-scale). The impact resistance strength of the impact-resistant polystyrene resin HSI of Example 1 and the impact-resistant polystyrene resin HSII of Example 2 is even greater than 12.0 (kJ/m$^2$). Compared to the polystyrene resins PSI-PSIII of Comparative Examples listed in Table 6, the impact-resistant polystyrene resins HSI-HSXII made of the polystyrene composition of the present disclosure have better Melt Flow Indexes, tensile strengths, flexural strengths, heat distortion temperatures, and Rockwell hardness.

Measuring Melt Flow Index, tensile strength, flexural strength, heat distortion temperature, Rockwell hardness, and impact resistance strength of the impact-resistant polystyrene resin (HP9450) sold by *Formosa* Chemicals & Fibre Corporation under the same conditions as above. The Melt Flow Index of HP9450 is 1.7 (200° C. @5 kg). The tensile strength of HP9450 is 308 (kg/cm$^2$). The flexural strength of HP9450 is 489 (kg/cm$^2$). The heat distortion temperature of HP9450 is 92.3° C. The Rockwell hardness of HP9450 is 100.9 (R-scale), and the impact strength of HP9450 is 12.6 (kJ/m$^2$). It is clear that regarding the impact resistance and the processing performance, the impact-resistant polystyrene resins made of the polystyrene composition of the present disclosure have reached the level of commercially available impact-resistant polystyrene resins. Therefore, the impact-resistant polystyrene resins made of the polystyrene composition of the present disclosure may be used in the industry. All of the polystyrene plastic used in the polystyrene composition of the present disclosure is recycled polystyrene plastic. The polystyrene resin made of the polystyrene composition of the present disclosure reaches the level of impact-resistant polystyrene resin required by the industry. It will increase the willingness of manufacturers to use recycled polystyrene plastics, help the recycling of waste polystyrene plastics, and significantly reduce polystyrene plastic waste in the ocean.

The foregoing outlines features of embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An impact-resistant polystyrene resin, comprising:
a continuous phase; and
a plurality of particles dispersed in the continuous phase,
wherein an average particle size of the particles is 0.1 to 4.0 µm, and an average distance between the particles is 0.3 to 5.0 µm,
wherein the impact-resistant polystyrene resin is made from a polystyrene composition, the polystyrene composition comprising:
a polystyrene plastic,
a styrene block copolymer,
a processing aid, and
an antioxidant,
wherein the polystyrene plastic consists of a recycled polystyrene plastic, and
wherein the polystyrene composition comprises 5-30 parts by weight of the styrene block copolymer, 0.1-1.0 parts by weight of the processing aid, and 0.1-1.0 parts by weight of the antioxidant based on 100 parts by weight of the polystyrene plastic.

2. The impact-resistant polystyrene resin as claimed in claim 1, wherein the average particle size of the particles is 0.1 to 3.0 µm, and the average distance between the particles is 0.3 to 4.0 µm.

3. The impact-resistant polystyrene resin as claimed in claim 1, wherein the particles comprise the styrene block copolymer.

4. The impact-resistant polystyrene resin as claimed in claim 1, wherein the polystyrene plastic contains less than 500 ppm of impurities.

5. The impact-resistant polystyrene resin as claimed in claim 1, wherein the styrene block copolymer comprises styrene-ethylene-butylene-styrene rubber, styrene-ethylene-propylene-styrene rubber, styrene-butadiene rubber, styrene-isoprene-styrene rubber, or a combination thereof.

6. The impact-resistant polystyrene resin as claimed in claim 1, wherein the processing aid comprises a lubricant, an antistatic agent, a stabilizer, a plasticizer, or a combination thereof.

7. The impact-resistant polystyrene resin as claimed in claim 1, wherein the antioxidant comprises a hindered phenolic antioxidant, a thioester antioxidant, a phosphite antioxidant, or a combination thereof.

8. An impact-resistant polystyrene resin manufactured by the following method:
providing a polystyrene composition, the polystyrene composition comprising a polystyrene plastic, a styrene block copolymer, a processing aid, and an antioxidant; and
melting and kneading the polystyrene composition with an extruder to obtain the impact-resistant polystyrene resin,
wherein the impact-resistant polystyrene resin comprises a continuous phase and a plurality of particles dispersed in the continuous phase,
wherein the average particle size of the particles is 0.1 to 4.0 µm, and the average distance between the particles is 0.3 to 5.0 µm,
wherein the polystyrene plastic consists of a recycled polystyrene plastic, and
wherein the polystyrene composition comprises 5-30 parts by weight of the styrene block copolymer, 0.1-1.0 parts by weight of the processing aid, and 0.1-1.0 parts by weight of the antioxidant based on 100 parts by weight of the polystyrene plastic.

9. The impact-resistant polystyrene resin as claimed in claim 8, wherein a process temperature and a rotation speed used in the step of melting and kneading the composition are 150~300° C. and 50~300 rpm respectively.

10. The impact-resistant polystyrene resin as claimed in claim 8, wherein method further includes granulating and drying the impact-resistant polystyrene resin.

* * * * *